(12) United States Patent
Takamine

(10) Patent No.: US 12,498,626 B2
(45) Date of Patent: Dec. 16, 2025

(54) PROJECTOR

(71) Applicant: SEIKO EPSON CORPORATION, Tokyo (JP)

(72) Inventor: Yusaku Takamine, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 434 days.

(21) Appl. No.: 18/088,948

(22) Filed: Dec. 27, 2022

(65) Prior Publication Data

US 2023/0205067 A1 Jun. 29, 2023

(30) Foreign Application Priority Data

Dec. 27, 2021 (JP) ................................. 2021-212428

(51) Int. Cl.
*G03B 21/16* (2006.01)
*G03B 21/20* (2006.01)

(52) U.S. Cl.
CPC ............. *G03B 21/16* (2013.01); *G03B 21/20* (2013.01)

(58) Field of Classification Search
CPC ................................ G03B 21/16; G03B 21/20
USPC ........................................................... 353/57
See application file for complete search history.

(56) References Cited

U.S. PATENT DOCUMENTS

| 2006/0244928 | A1 | 11/2006 | Hori |
| 2012/0257172 | A1* | 10/2012 | Shirakura ............... G03B 21/16 353/61 |
| 2014/0198304 | A1 | 7/2014 | Sun et al. |
| 2014/0354958 | A1 | 12/2014 | Tsuchitani et al. |

FOREIGN PATENT DOCUMENTS

| JP | H08186784 | A | * | 7/1996 |
| JP | 10200837 | A | * | 7/1998 |
| JP | 2009-064032 | A | | 3/2009 |
| JP | 2010191167 | A | * | 9/2010 |
| JP | 2010204342 | A | * | 9/2010 |
| JP | 2014-235360 | A | | 12/2014 |

OTHER PUBLICATIONS

Translation of JP_2010191167 (Year: 2025).*
Translation of JP_2010204342 (Year: 2025).*
Translation of JP_H08186784 (Year: 2025).*
Translation of JP 10200837 (Year: 2025).*

* cited by examiner

*Primary Examiner* — Jerry L Brooks
(74) *Attorney, Agent, or Firm* — Dority & Manning, P.A.

(57) ABSTRACT

A light source device includes an enclosure including a first housing part housing a first cooling target and a second housing part housing a second cooling target, the first cooling target being a terminal radiating heat and detachably housed in the first housing; and a first fan housed in the enclosure and cooling the first cooling target and the second cooling target by supplying an air current sucked from an outside of the enclosure to the first housing part and the second housing part in order. The first housing part is located on an inflow side of the air current with respect to the first fan. The second housing part is located on an outflow side of the air current with respect to the first fan.

16 Claims, 5 Drawing Sheets

PROJECTOR

The present application is based on, and claims priority from JP Application Serial Number 2021-212428, filed Dec. 27, 2021, the disclosure of which is hereby incorporated by reference herein in its entirety.

BACKGROUND

1. Technical Field

The present disclosure relates to a projector.

2. Related Art

There has been a projector that cools a wireless device (connected equipment) detachably attached to an enclosure using an air current taken into the enclosure by an exhaust fan (see, for example, JP-A-2014-235360 (Patent Literature 1)).

However, in the projector, since a part of exhaust after cooling an illumination optical system, an image forming unit, a light source device, and the like is used to cool the connected equipment, it is difficult to sufficiently cool the connected equipment. Therefore, it is conceivable to separately provide a cooling device for cooling the connected equipment. However, in this case, a device configuration of the projector is increased in size.

SUMMARY

According to an aspect of the present disclosure, there is provided a projector including: an enclosure including a first housing section configured to house a first cooling target and a second housing section partitioned from the first housing section by a wall section including a vent hole and configured to detachably house connected equipment, which is a second cooling target; and a first fan housed in the enclosure and configured to cool the first cooling target and the second cooling target by supplying an air current sucked from an outside of the enclosure to the first housing section and the second housing section. The second housing section of the enclosure is disposed on an inflow side of the air current with respect to the first fan. The first housing section of the enclosure is disposed on an outflow side of the air current with respect to the first fan.

According to an aspect of the present disclosure, there is provided a projector including: an enclosure including a first housing section and a second housing section partitioned from the first housing section by a wall section including a vent hole; a first cooling target housed in the first housing section; a second cooling target, which is connected equipment, detachably housed in the second housing section; and an intake fan housed in the enclosure and configured to cool the first cooling target and the second cooling target with an air current sucked from an outside of the enclosure. The connected equipment is disposed on an inflow side of the air current with respect to the intake fan. The first cooling target is disposed on an outflow side of the air current with respect to the intake fan.

DESCRIPTION OF EXEMPLARY EMBODIMENTS

Figure 1:
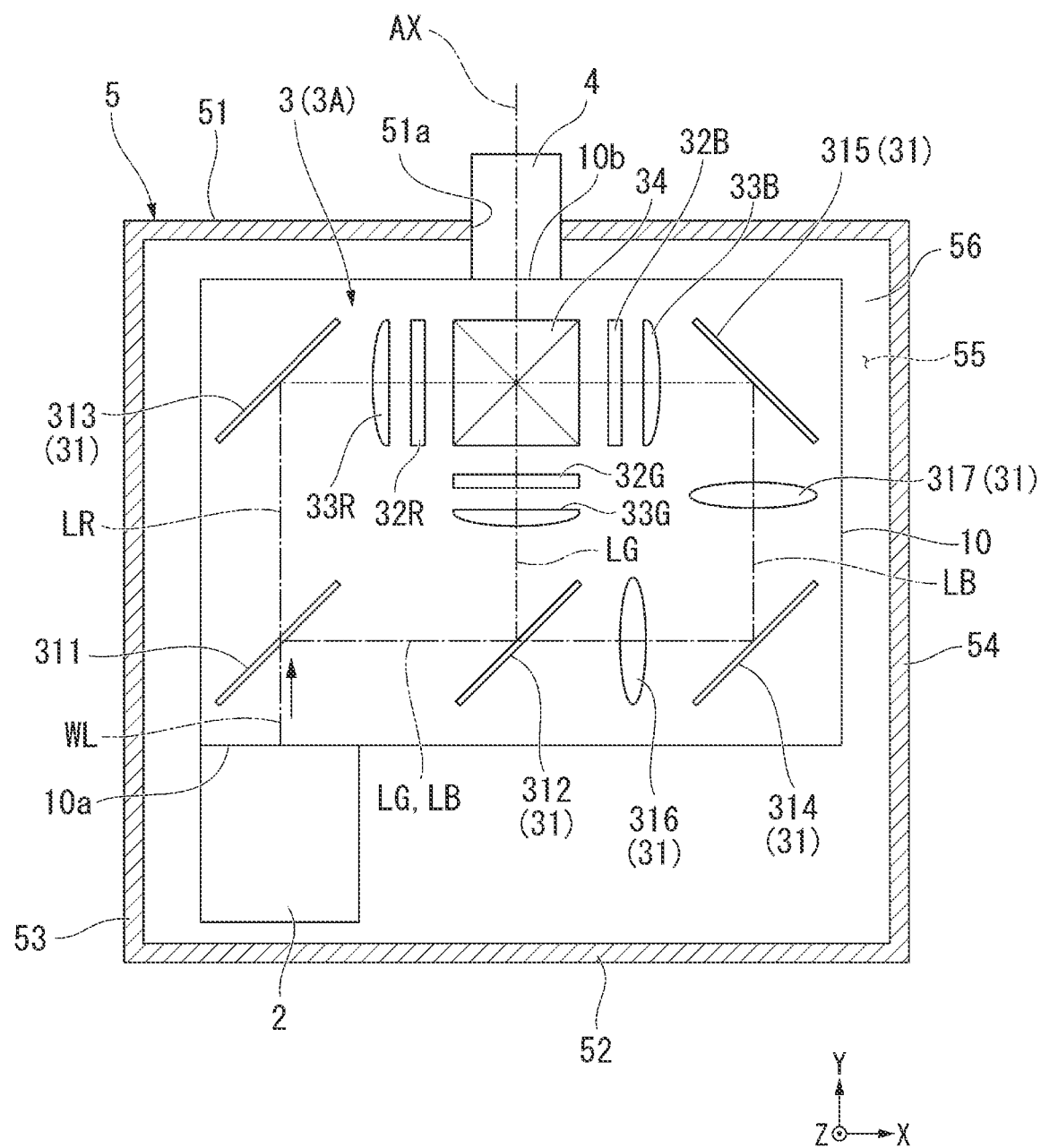
FIG. 1 is a diagram showing an overall configuration of a projector in an embodiment.

An embodiment of the present disclosure is explained below with reference to the drawings.

In the drawings referred to below, scales of dimensions are differentiated and shown depending on components in order to clearly show the components.

FIG. 1 is a diagram showing an overall configuration of a projector in this embodiment.

A projector 1 in this embodiment modulates illumination light emitted from a light source device 2 to generate image light corresponding to image information and enlarges and projects the formed image light onto a projection surface such as a screen. As shown in FIG. 1, the projector 1 includes a light source device 2, an image forming device 3, a projection optical device 4, and an enclosure 5.

In the drawings referred to below, an XYZ orthogonal coordinate system is used for explanation according to necessity. A Z axis is an axis extending in the up-down direction of the projector 1. A Y axis is an axis parallel to an optical axis AX of light projected from the projector 1. An X axis is an axis orthogonal to the Y axis and the Z axis.

In this embodiment, a direction along the Z axis is referred to as "up-down direction Z", +Z is referred to as "upper side", –Z is referred to as "lower side", a direction along the X axis is referred to as "left-right direction X", +X is referred to as "right side", –X is referred to as "left side", a direction along the Y axis is referred to as "front-rear direction Y", +Y is referred to as "front side", and –Y is referred to as "rear side".

The up-down direction Z, the left-right direction X, and the front-rear direction Y are merely names for explaining disposition relations among constituent members of the projector 1 and do not specify actual setting postures and directions in the projector 1.

The light source device 2 is connected to a light source connecting section 10a provided in a case 10 of the image forming device 3 explained below.

The light source device 2 supplies white illumination light WL to an image forming section 3A of the image forming device 3. For example, the light source device 2 in this embodiment generates the white illumination light WL including yellow fluorescent light generated by wavelength-converting, with a phosphor, excitation light emitted from a light source module including a semiconductor laser and blue light transmitted through the phosphor. The light source device 2 is not limited to a configuration using laser light. An LED and a discharge lamp can also be used.

The image forming device 3 generates image light using the illumination light WL emitted from the light source device 2. The image forming device 3 includes the case 10, the image forming section 3A housed in the case 10, and a color separation and light guide optical system 31 housed in the case 10. The case 10 houses the image forming section 3A and the color separation and light guide optical system 31 in a state in which the image forming section 3A and the color separation and light guide optical system 31 are held in predetermined positions.

The image forming section 3A includes light modulation panels 32R, 32G, and 32B and a cross dichroic prism 34. Each of the light modulation panels 32R, 32G, and 32B modulates, according to image information, color light made incident thereon and forms image light. Each of the light modulation panels 32R, 32G, and 32B is configured by a light transmissive liquid crystal panel.

The light modulation panel 32R modulates red light LR according to the image information and forms image light corresponding to the red light LR. The light modulation panel 32G modulates green light LG according to the image information and forms image light corresponding to the green light LG. The light modulation panel 32B modulates blue light LB according to the image information and forms image light corresponding to the blue light LB.

The cross dichroic prism 34 combines the image lights emitted from the light modulation panels 32R, 32G, and 32B. The cross dichroic prims 34 is formed in a substantially square shape in planar view obtained by sticking together four right-angle prisms. A dielectric multilayer film is provided on a substantially X-shaped interface of the right-angle prisms stuck together. The image forming section 3A can generate full-color image light by combining the color image lights.

In this embodiment, field lenses 33R, 33G, and 33B are respectively provided on light incident sides of the light modulation panels 32R, 32G, and 32B. The field lens 33R collimates a main beam of the red light LR made incident on the light modulation panel 32R. The field lens 33G collimates a main beam of the green light LG made incident on the light modulation panel 32G. The field lens 33B collimates a main beam of the blue light LB made incident on the light modulation panel 32B.

Although not illustrated, incident side polarization plates are disposed between the light modulation panels 32R, 32G, and 32B and the field lenses 33R, 33G, and 33B and emission side polarization plates are disposed between the light modulation panels 32R, 32G, and 33B and the cross dichroic prism 34.

The color separation and light guide optical system 31 separates the illumination light WL emitted from the light source device 2 into the red light LR, the green light LG, and the blue light LB and guides the red light LR, the green light LG, and the blue light LB to the light modulation panels 32R, 32G, and 32B. The color separation and light guide optical system 31 includes a first dichroic mirror 311, a second dichroic mirror 312, a first reflection mirror 313, a second reflection mirror 314, a third reflection mirror 315, a first relay lens 316, and a second relay lens 317.

The first dichroic mirror 311 transmits the red light LR and reflects the green light LG and the blue light LB. Of the green light LG and the blue light LB reflected by the first dichroic mirror 311, the second dichroic mirror 312 reflects the green light LG and transmits the blue light LB. The first reflection mirror 313 reflects the red light LR. The second reflection mirror 314 and the third reflection mirror 315 reflect the blue light LB. The first relay lens 316 is disposed between the second dichroic mirror 312 and the second reflection mirror 314. The second relay lens 317 is disposed between the second reflection mirror 314 and the third reflection mirror 315.

The projection optical device 4 is connected to a projection optical unit connecting section 10b provided in the case 10 of the image forming device 3. The projection optical device 4 is configured from a projection lens group. Lights from the light modulation panels 32R, 32G, and 32B of the image forming section 3A are made incident on the projection optical device 4 via the projection optical unit connecting section 10b of the case 10. The projection optical device 4 enlarges and projects the image lights combined by the cross dichroic prism 34 toward the screen. Consequently, an enlarged color image is displayed on the screen.

In recent years, a device (connection equipment) such as an SMP (Smart Media Player: registered trademark) is sometimes attached to a projector to view and listen to contents.

In general, when the SMP is attached to the projector, the SMP is connected to an external input terminal of the projector. Therefore, an SMP main body is connected to the projector via an HDMI (High-Definition Multimedia Interface: registered trademark) cable and a power feed cable. Therefore, appearance of the projector at a content viewing and listening time is deteriorated.

Therefore, when the appearance deterioration is prevented by disposing the HDMI cable, the power feed cable, and the SMP main body inside the projector, it is likely that heat dissipation of the SMP is deteriorated and the temperature of the SMP rises in the projector to cause an operation failure such as hung-up. It is also conceivable to separately provide a fan exclusively for the SMP. However, in this case, a cost increase and an increase in the size of the projector are likely to occur because the number of components increases. Noise and power consumption are likely to increase because the number of fans increases.

Even when the appearance deterioration is prevented while a device configuration of the projector 1 is reduced in size by detachably housing the device such as the SMP in the enclosure 5, the projector 1 in this embodiment is capable of preventing an operation failure of the device by efficiently cooling the device. In the projector 1 in this embodiment, the device is not included in constituent components of the projector 1.

In the projector 1 in this embodiment, a plurality of heat sources are disposed in the enclosure 5. Specifically, a first heat source is equivalent to the light source device 2, a second heat source is equivalent to the light modulation panels 32R, 32G, and 32B of the image forming device 3, and a third heat source is equivalent to a device DB.

The enclosure 5 in this embodiment includes a front surface section 51, a rear surface section 52, a left side surface section 53, a right side surface section 54, a top surface section 55, and a bottom surface section 56. The enclosure 5 is formed in, for example, a substantially rectangular parallelepiped shape. In FIG. 1, the top surface section 55 is illustrated as a transparent member in order to show an internal structure of the enclosure 5.

The front surface section 51 is a plate-like part located on the front side (+Y) in the front-rear direction Y and extending along an XZ plane.

The rear surface section 52 is a plate-like part located on the rear side (−Y) in the front-rear direction Y and extending along the XZ plane.

The left side surface section 53 is a plate-like part located on the left side (−X) in the left-right direction X and extending along a YZ plane.

The right side surface section 54 is a plate-like part located on the right side (+X) in the left-right direction X and extending along the YZ plane.

The top surface section 55 is a plate-like part coupling the end portions on the upper side (+Z) of the front surface section 51, the rear surface section 52, the left side surface section 53, and the right side surface section 54 and extending along an XY plane.

The bottom surface section 56 is a plate-like part coupling the end portions on the lower side (−Z) of the front surface section 51, the rear surface section 52, the left side surface section 53, and the right side surface section 54 and extending along the XY plane.

The front surface section 51 includes an opening section 51a provided substantially in the center. The projection optical device 4 is inserted into the enclosure 5 via the opening section 51a and connected to the image forming device 3. In the case of this embodiment, the front end portion of the projection optical device 4 is projected to the outer side of the enclosure 5 via the opening section 51a. However, the front end portion of the projection optical device 4 may be located further on the inner side of the enclosure 5 than the opening section 51a.

Figure 2:
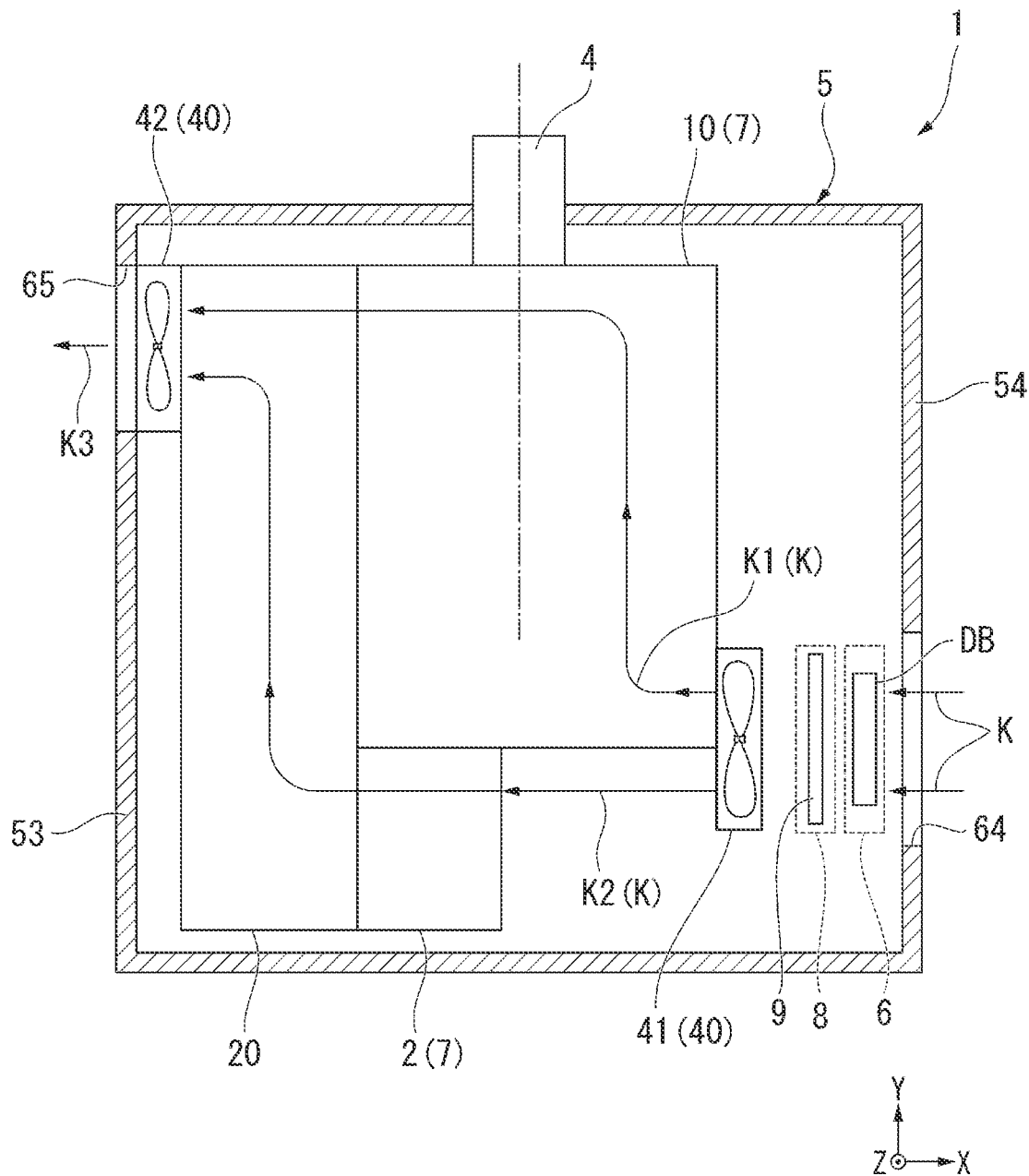
FIG. 2 is a schematic diagram showing a cooling path in a cooling device of the projector.

The projector 1 in this embodiment includes a cooling device that cools the three heat sources. FIG. 2 is a schematic diagram showing a cooling path in the cooling device of the projector 1.

As shown in FIG. 2, a cooling device 40 includes an intake fan (a first fan) 41 and an exhaust fan (a second fan) 42. That is, the projector 1 in this embodiment further includes the intake fan 41 and the exhaust fan 42. The intake fan 41 and the exhaust fan 42 are housed in the enclosure 5. As the intake fan 41 and the exhaust fan 42, for example, an axial fan, a centrifugal fan, and a sirocco fan can be used. However, types of the fans are not limited to these fans.

The enclosure 5 in this embodiment includes a first housing section 6, a second housing section 7, and a third housing section 8. The device DB is detachably housed in the first housing section 6. In this embodiment, the device DB is a first cooling target to be cooled by the cooling device 40. The light source device 2 and the image forming device 3 are housed in the second housing section 7. In this embodiment, the light source device 2 and the image forming device 3 are second cooling targets to be cooled by the cooling device 40. A dustproof filter 9 is housed in the third housing section 8.

The intake fan 41 cools the device DB, which is the first cooling target, and the light source device 2 and the image forming device 3, which are the second cooling targets, by supplying an air current K sucked from the outside of enclosure 5 to the first housing section 6 and the second housing section 7 in order. The intake fan 41 takes the air current K into the inside via an intake port 64 provided in the enclosure 5. The intake port 64 is provided on the right side surface section 54 of the enclosure 5. A detailed configuration of the intake port 64 is explained below.

In the case of this embodiment, the intake fan 41 and the intake port 64 are disposed side by side in the left-right direction X. When the intake fan 41 is driven, a flow of the air current K from the intake port 64 to the intake fan 41 is generated.

In this embodiment, the first housing section 6 is located on the intake port 64 side of the intake fan 41. That is, the first housing section 6 is located on an inflow side of the air current K with respect to the intake fan 41. The intake fan 41 supplies the air current K having low temperature sucked from the intake port 64 to the first housing section 6 and cools the device DB housed in the first housing section 6.

In the case of this embodiment, the intake port 64, the first housing section 6, and the intake fan 41 are disposed on a straight line in the left-right direction X. With this configuration, since the air current K linearly flows from the intake port 64 toward the intake fan 41, fluidity of the air current K increases and, therefore, cooling performance can be further improved.

The second housing section 7 is located on the opposite side of the intake port 64 with respect to the intake fan 41. That is, the second housing section 7 is located on the outflow side of the air current K with respect to the intake fan 41. The intake fan 41 supplies the air current K to the second housing section 7 and cools the light source device 2 and the image forming device 3 housed in the second housing section 7.

In the following explanation, a part of the air current K flowing out from the intake fan 41 is referred to as air current K1 and the other part of the air current K flowing out from the intake fan 41 is referred to as air current K2.

In this embodiment, the air current K1 from the intake fan 41 is supplied to the image forming device 3. Specifically, the air current K1 is supplied from a not-shown opening provided in the case 10 of the image forming device 3 and cools the light modulation panels 32R, 32G, and 32B (see FIG. 1) housed in the case 10. The air current K1 having cooled the light modulation panels 32R, 32G, and 32B flows into the exhaust fan 42 via an exhaust duct 20.

The air current K2 from the intake fan 41 cools the light source device 2. The air current K2 having cooled the light source device 2 flows into the exhaust fan 42 via the exhaust duct 20. In this embodiment, the air current K1 having cooled the image forming device 3, which is the second cooling target, and the air current K2 having cooled the light source device 2, which is the second cooling target, flow into the exhaust fan 42 via the exhaust duct 20. The exhaust fan 42 discharges exhaust K3 including the air current K1 and the air current K2 to the outside of the enclosure 5. The exhaust fan 42 discharges the exhaust K3 to the outside via an exhaust port 65 provided in the left side surface section 53.

Figure 3:
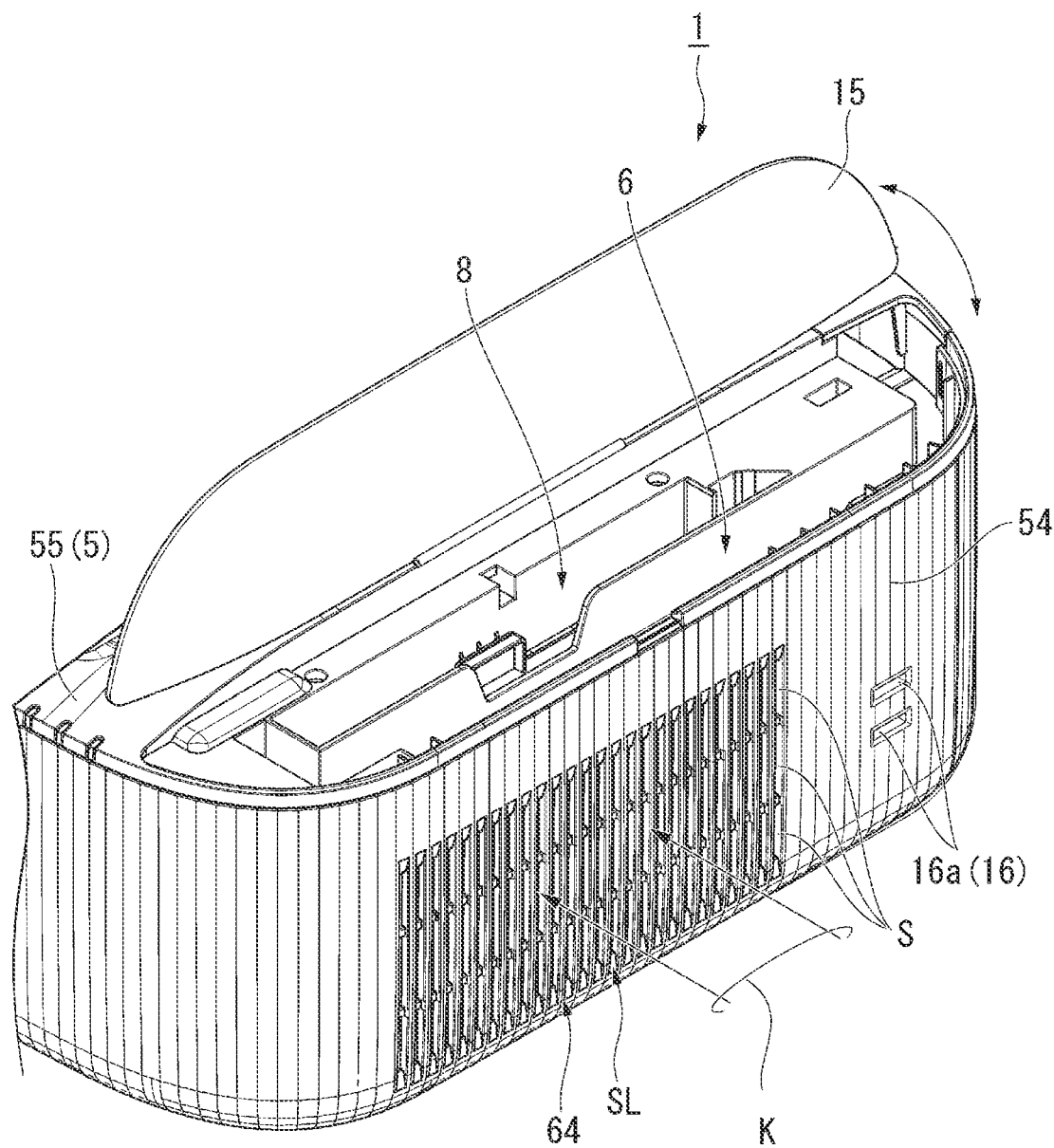
FIG. 3 is a perspective view showing a main part of an enclosure.
Figure 4:
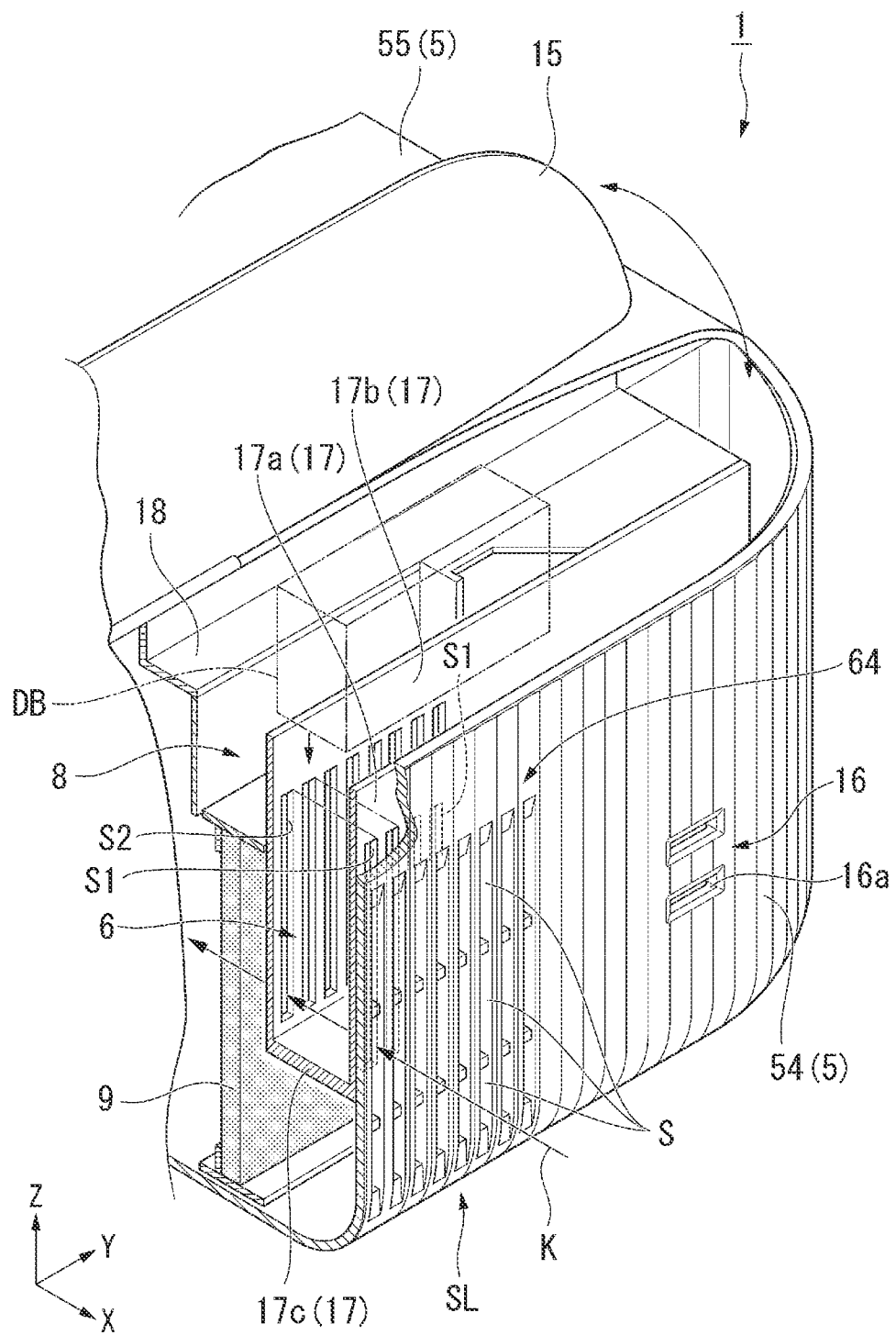
FIG. 4 is a perspective sectional view showing the main part of the enclosure.

FIG. 3 is a perspective view showing a main part of the enclosure 5. FIG. 4 is a perspective view showing a cross section taken along a surface parallel to the XZ plane shown in FIG. 3.

As shown in FIGS. 3 and 4, the intake port 64 is configured by a plurality of slits S. In the case of this embodiment, the intake port 64 is configured by disposing a plurality of slit rows SL, in each of which three slits S are arranged in the up-down direction Z, in the front-rear direction Y. Based on such a configuration, the intake port 64 in this embodiment is enabled to efficiently take the air current K from the outside into the inside of the enclosure 5.

The projector 1 in this embodiment includes connector sections 16. The connector sections 16 are provided on the front side (+Y) of the intake port 64 in the right side surface section 54 of the enclosure 5.

In the projector 1 in this embodiment, a circuit board and the device DB can be electrically connected by connecting the not-shown HDMI cable and the not-shown power feed cable drawn into the first housing section 6 to the device DB housed in the first housing section 6. With the projector 1 in this embodiment, since the HDMI cable and the power feed cable connected to the device DB are not exposed to the outer side of the enclosure 5, it is possible to prevent appearance of the exterior from being deteriorated when the device DB is used.

The connector sections 16 are electrically connectable to the circuit board housed in the enclosure 5. The connector sections 16 are external input terminals that enable an external input from external equipment to the projector 1. The connector sections 16 include USB terminals 16a having the USB standard. In the case of this embodiment, the connector sections 16 are, for example, USB terminals adapted to the TYPE-A standard. The connector sections 16 may be directly connected to the circuit board or may be connected to a substrate separate from the circuit board. A position where the connector sections 16 are provided is not limited to the right side surface section 54 of the enclosure 5. The connector sections 16 may be provided in, for example, any one of the front surface section 51, the rear surface section 52, the left side surface section 53, and the top surface section 55 or may be provided to be distributed in at least two of the right side surface section 54, the front surface section 51, the rear surface section 52, the left side surface section 53, and the top surface section 55.

As shown in FIG. 4, the enclosure 5 in this embodiment further includes separators 17. In the case of this embodiment, the separators 17 are provided integrally with the top surface section 55 of the enclosure 5. The separators 17 are members that partition the first housing section 6. The first housing section 6 is partitioned by the separators 17 and is provided in a recessed state to the inside of the enclosure 5 in the up-down direction Z. The upper side (+Z) of the first housing section 6 is opened in the top surface section 55 of the enclosure 5. As indicated by an alternate long and two short dashes line in FIG. 4, the device DB is inserted into the first housing section 6 from the upper side (+Z) in the up-down direction Z to be housed in the enclosure 5.

The separators 17, which partition the first housing section 6, are configured by a sheet metal member including a part, a cross section of which taken along a surface parallel to the XZ plane is U-shaped. The separators 17 include a first plate material 17a and a second plate material 17b and a third plate material 17c that couples the lower ends of the first plate material 17a and the second plate material 17b. The first plate material 17a and the second plate material 17b are disposed side by side in the left-right direction X, which is an inflow direction of the air current K into the first housing section 6.

A plurality of slits (first through-holes) S1 extending in the up-down direction Z are provided in the first plate material 17a. The slits S1 are through-holes that pierce through the first plate material 17a. The slits S1 are disposed side by side in the front-rear direction Y. The slits S1 communicate with the intake port 64. The slits S1 and the intake port 64 communicating means that the air current K flowing in from the intake port 64 becomes capable of flowing into the first housing section 6 via the slits S1.

In the case of this embodiment, in a planar view in the left-right direction X, which is the inflow direction of the air current K, the slits S1 overlap any ones of a plurality of slits S configuring the intake port 64.

With this configuration, since the slits S1 and the intake port 64 overlap in the inflow direction of the air current K, the air current K sucked from the intake port 64 efficiently passes through the slits S1 and flows into the first housing section 6. Accordingly, since the air current K efficiently flows into the first housing section 6 via the slits S1, the first housing section 6 can improve a cooling effect for the device DB.

A plurality of slits (second through-holes) S2 extending in the up-down direction Z are provided in the second plate material 17b. The slits S2 are disposed side by side in the front-rear direction Y. In this embodiment, the slits S2 of the second plate material 17b and the slits S1 of the first plate material 17a overlap each other in the left-right direction X, which is the inflow direction of the air current K. The slits S2 cause the air current K to flow out from the first housing section 6.

In a planar view in the inflow direction of the air current K, if the entire slits S1 and S2 overlap the device DB, the entire air current K flowing into the first housing section 6 via the first slits S1 is likely to collide with the device DB and cause large noise. Since a flow of the air current K to the second slits S2 side is prevented by the device DB, it is likely that the air current K is less easily discharged from the first housing section 6 and the first housing section 6 is filled with heat.

In the case of this embodiment, positions in the up-down direction Z in the slits S1 and S2 are formed to protrude to the outer side of the device DB. Consequently, a part of the air current K flowing into the first housing section 6 generates a flow efficiently discharged from the first housing section 6 via the second slits S2 without colliding with the device DB. Accordingly, in the case of this embodiment, it is possible to prevent occurrence of the noise and efficiently discharge heat from the first housing section 6.

The enclosure 5 in this embodiment further includes a filter supporting member 18. The filter supporting member 18 is provided integrally with the top surface section 55 of the enclosure 5 and the separators 17. The filter supporting member 18 is disposed side by side with the second plate material 17b of the separators 17 on the intake fan 41 side. The filter supporting member 18 is a member configuring the third housing section 8 that houses the dustproof filter 9 together with the second plate material 17b. The dustproof filter 9 is a filter that removes dust included in the air current K. The third housing section 8 is disposed between the first housing section 6 and the intake fan 41. That is, the dustproof filter 9 is disposed on the intake fan 41 side of the first housing section 6.

The third housing section 8 is provided in a recessed state to the inside of the enclosure 5 in the up-down direction Z. The upper side (+Z) of the third housing section 8 is opened in the top surface section 55 of the enclosure 5. The dustproof filter 9 is inserted into the third housing section 8 from the upper side (+Z) in the up-down direction Z to be attached to the enclosure 5. In FIG. 4, a state in which the dustproof filter 9 is inserted into the third housing section 8 is shown. The dustproof filter 9 is made detachably attachable to the third housing section 8.

When the device DB is made detachably attachable to the first housing section 6 as explained above, dust adhering to the device DB is likely to intrude into the first housing section 6 together with the device DB.

In the case of this embodiment, in a planar view in the left-right direction X, which is the inflow direction of the air current K into the first housing section 6, the third housing section 8 is disposed to overlap the first housing section 6. That is, the dustproof filter 9 is disposed to overlap the device DB in the inflow direction of the air current K. In the case of this embodiment, a plane area of the third housing section 8 (the dustproof filter 9) is set larger than a plane area of the first housing section 6 (the device DB).

With the projector 1 in this embodiment, even when dust adhering to the device DB is discharged from the first housing section 6 by the air current K, the dust included in the air current K can be removed by the dustproof filter 9 disposed in a post stage of the first housing section 6. Accordingly, by removing, with the dustproof filter 9, the dust flowing in from the first housing section 6 together with the air current K, it is possible to prevent a deficiency such as heat generation and a decrease in transmittance due to adhesion of the dust to other optical components and the like disposed in the enclosure 5.

In the case of this embodiment, in a planar view in the left-right direction X, which is the inflow direction of the air current K from the intake port 64 into the first housing section 6, a plane area of the intake port 64 is set larger than the plane area of the first housing section 6. The plane area of the dustproof filter 9 is set to be equal to or larger than the plane area of the intake port 64.

In the case of the projector 1 in this embodiment, a part of the air current K sucked from the intake port 64 flows into the first housing section 6. The remaining part of the air current K sucked from the intake port 64 directly flows into the dustproof filter 9 not through the first housing section 6.

That is, the air current K sucked from the intake port 64 flows into the dustproof filter 9 irrespective of whether the air current K flows through or not through the first housing section 6. Accordingly, in the projector 1 in this embodiment, it is possible to prevent intrusion of dust into the inside even when a dustproof filter is not separately provided in an inlet (an intake surface) of the intake port 64.

As shown in FIG. 3, the device DB and the first housing section 6 that houses the device DB have a shape longitudinal in the front-rear direction Y. That is, the longitudinal direction of the first housing section 6 crosses (is orthogonal to) the left-right direction X, which is the inflow direction of the air current K.

The dustproof filter 9 and the third housing section 8 that houses the dustproof filter 9 have a shape longitudinal in the front-rear direction Y. That is, the longitudinal direction of the third housing section 8 crosses (is orthogonal to) the left-right direction X, which is the inflow direction of the air current K.

In this embodiment, the longitudinal direction of the third housing section 8 is along the longitudinal direction of the first housing section 6.

If the longitudinal direction of the third housing section 8 and the longitudinal direction of the first housing section 6 are different, since the dimension in the latitudinal direction of the third housing section 8 is set according to the dimension in the longitudinal direction of the first housing section 6, the dimension of the third housing section 8 larger than necessary causes an increase in the size of the device configuration.

In contrast, in the projector 1 in this embodiment, it is possible to prevent an increase in the size of the device configuration by aligning the longitudinal direction of the third housing section 8 and the longitudinal direction of the first housing section 6 as explained above.

As shown in FIGS. 3 and 4, the enclosure 5 in this embodiment includes an openable and closable lid body 15. The lid body 15 is openably and closably attached to a predetermined position of the top surface section 55 of the enclosure 5 by, for example, a hinge structure. An opening and closing structure of the lid body 15 is not limited to the hinge structure and may be a slide structure, a fitting structure, or the like.

The lid body 15 is provided in a position where the lid body 15 covers the first housing section 6 and the third housing section 8 in a closed state. The lid body 15 is configured to be flush with the surface of the top surface section 55 in the closed state. In this embodiment, in the enclosure 5, when the lid body 15 is opened, an upper part Da of the device DB housed in the first housing section 6 and an upper part of the dustproof filter 9 housed in the third housing section 8 are exposed. That is, in the enclosure 5 in this embodiment, it is possible to access the device DB and the dustproof filter 9 by opening the lid body 15. Therefore, it is possible to easily perform work for attaching and detaching the device DB and the dustproof filter 9 to and from the enclosure 5.

As explained above, the projector 1 in this embodiment includes the enclosure 5 including the first housing section 6 that detachably houses the device DB, which is the first cooling target, and the second housing section 7 that houses the image forming device 3 and the light source device 2, which are the second cooling targets, and the intake fan 41 that is housed in the enclosure 5 and cools the first cooling target and the second cooling targets by supplying the air current K sucked from the outside of the enclosure 5 to the first housing section 6 and the second housing section 7 in order. The first housing section 6 is located on the inflow side of the air current K with respect to the intake fan 41. The second housing section 7 is located on the outflow side of the air current K with respect to the intake fan 41.

With the projector 1 in this embodiment, since the device DB is disposed on the inflow side of the air current K into the intake fan 41, it is possible to efficiently cool the device DB with the air current K having low temperature. In the projector 1 in this embodiment, since the first housing section 6 is provided in a space on the inflow side of the intake fan 41 not used for cooling in the past, it is possible to effectively use a space in the enclosure 5 when two cooling targets are cooled by one intake fan 41. Accordingly, the projector 1 in this embodiment can prevent an increase in the size of the device configuration and efficiently cool the device DB detachably attached to the enclosure 5.

In the projector 1 in this embodiment, the enclosure 5 further includes the third housing section 8 that is disposed between the first housing section 6 and the intake fan 41 and houses the dustproof filter 9.

With this configuration, even when dust adhering to the device DB is discharged from the first housing section 6 by the air current K, it is possible to remove the dust included in the air current K with the dustproof filter 9 disposed in the post stage of the first housing section 6.

In the projector 1 in this embodiment, in the planar view in the inflow direction of the air current K into the first housing section 6, the third housing section 8 is disposed to overlap the first housing section 6, the longitudinal direction of the first housing section 6 and the longitudinal direction of the third housing section 8 crosses the inflow direction of the air current K, and the longitudinal direction of the third housing section 8 is along the longitudinal direction of the first housing section 6.

With this configuration, since the dustproof filter 9 and the device DB overlap in the inflow direction of the air current K, it is possible to satisfactorily remove dust in the air current K. It is possible to prevent an increase in the size of the device configuration compared with when the longitudinal direction of the third housing section 8 and the longitudinal direction of the first housing section 6 are different.

In the projector 1 in this embodiment, the enclosure 5 includes the openable and closable lid body 15. The lid body 15 is opened to make the device DB attachable to and detachable from the first housing section 6.

With this configuration, since the first housing section 6 can be covered by closing the lid body 15, it is possible to improve appearance of the exterior. It is possible to prevent intrusion of dust into the first housing section 6 by closing the lid body 15.

In the projector 1 in this embodiment, the enclosure 5 includes the intake port 64 for taking the air current K into the inside and the separators 17 that partition the first housing section 6. In the separators 17, the first slits S1 communicating with the intake port 64 and the second slits S2 for causing the air current K to flow out from the first housing section 6 are provided.

With this configuration, it is possible to improve cooling efficiency for the device DB by efficiently taking the air current K into the first housing section 6 via the intake port 64 and the first slits S1. For example, when the device DB has a connecting function to a network, since the inside and the outside of the first housing section 6 communicate via the intake port 64 and the first slits S1, it is possible to effectively exert network performance of the device DB.

In the projector 1 in this embodiment, the intake port 64, the first housing section 6, and the intake fan 41 are disposed on the straight line.

With this configuration, since the fluidity of the air current K is improved, it is possible to further improve the cooling performance.

The projector 1 in this embodiment further includes the light source device 2, the image forming device 3 that generates image light using light emitted from the light source device 2, and the exhaust fan 42 that is housed in the enclosure 5 and discharges the exhaust K3 having cooled the device DB and the light source device 2 and the image forming device 3. The air current K1, which is a part of the air current K flowing out from the intake fan 41, cools the image forming device 3 and flows into the exhaust fan 42. The air current K2, which is the other part of the air current K flowing out from the intake fan 41, cools the light source device 2 and flows into the exhaust fan 42. The exhaust fan 42 discharges the exhaust K3 including the air current K1 and the air current K2 to the outside of the enclosure 5.

With this configuration, it is possible to efficiently cool the image forming device 3 and the light source device 2 by dividing the air current K taken into the enclosure 5. Since the air current K1 and the air current K2 having cooled the image forming device 3 and the light source device 2 are discharged from the enclosure 5 by one exhaust fan 42, it is possible to prevent an increase in the size of the device configuration compared with when exhaust fans corresponding to the air currents K1 and K2 are separately provided.

The technical scope of the present disclosure is not limited to the embodiment. Various changes can be added without departing from the gist of the present disclosure. One aspect of the present disclosure can be configured by combining the characteristic portions of the embodiment explained above as appropriate.

First Modification

Subsequently, a first modification of the projector is explained.

Figure 5A:
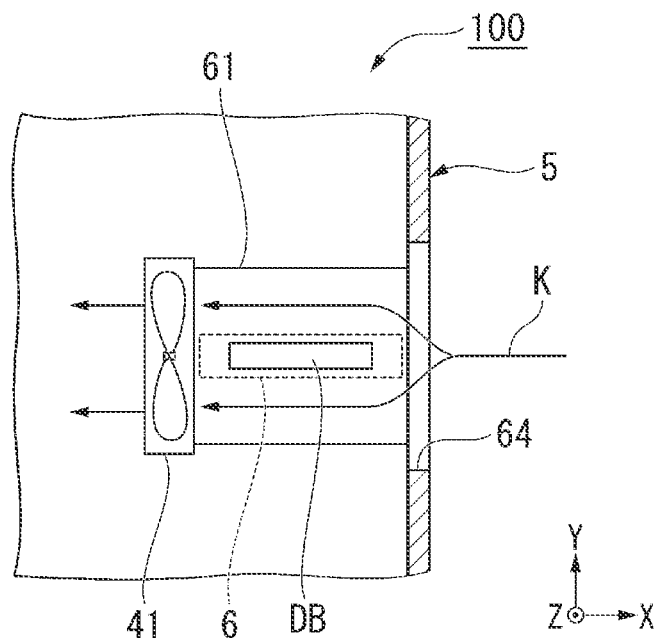
FIG. 5A is an enlarged diagram showing a main part configuration of a projector according to a first modification.

FIG. 5A is an enlarged diagram showing a main part configuration of a projector according to the first modification. Components common to the embodiment are denoted by the same reference numerals and signs. Detailed explanation of the components is omitted.

As shown in FIG. 5A, a projector 100 in this modification further includes a duct 61 that circulates the air current K to the intake fan 41 via the intake port 64. The duct 61 extends in the left-right direction X. In the projector 100 in this modification, the first housing section 6 is provided in the duct 61. Specifically, the first housing section 6 is provided in the duct 61 in a state in which the long side direction of the first housing section 6 is aligned with the left-right direction X, which is an extending direction of the duct 61.

With the projector 100 in this modification, since the air current K flows in the long side direction of the device DB, it is possible to improve the cooling efficiency for the device DB.

Second Modification

Subsequently, a second modification of the projector is explained.

Figure 5B:
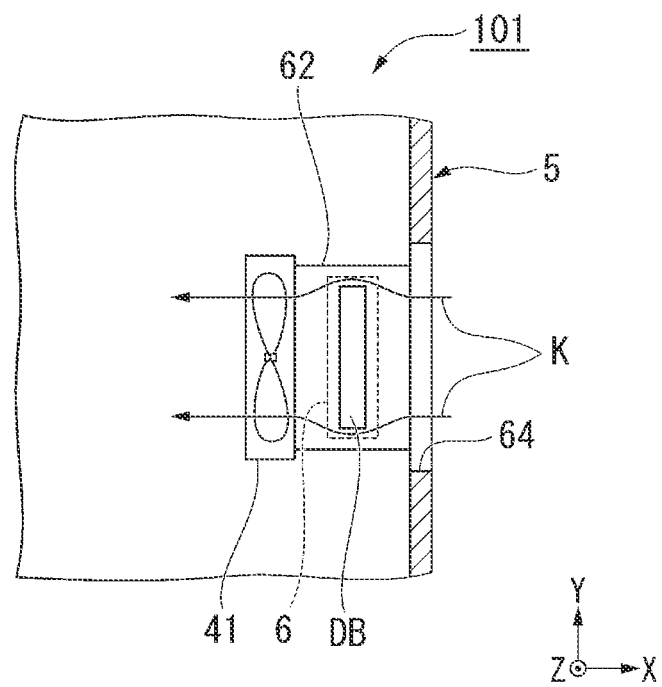
FIG. 5B is an enlarged diagram showing a main part configuration of a projector according to a second modification.

FIG. 5B is an enlarged diagram showing a main part configuration of a projector according to the second modification. Components common to the embodiment explained above are denoted by the same reference numerals and signs. Explanation is omitted about details of the components.

As shown in FIG. 5B, a projector 101 in this modification further includes a duct 62 that circulates the air current K to the intake fan 41 via the intake port 64. The duct 62 extends in the left-right direction X. In this modification, the first housing section 6 is provided in the duct 62. Specifically, the first housing section 6 is provided in the duct 62 in a state in which the short side direction of the first housing section 6 is aligned with the left-right direction X, which is an extending direction of the duct 62. That is, the direction of the first housing section 6 in the projector 101 in this modification is different from the direction of the first housing section 6 in the projector 100 in the first modification by 90 degrees.

With the projector 101 in this modification, since the air current K flows along the short side of the device DB, it is possible to reduce the enclosure 5 in size in the left-right direction X by forming the duct 62 shorter compared with the configuration in the first modification.

In the embodiment, as an example, the device DB is not included in the constituent components of the projector 1. However, the device DB may be included in the constituent components of the projector.

That is, the projector in this aspect includes the enclosure 5 including the first housing section 6 and the second housing section 7, the device DB, which is the first cooling target, detachably housed in the first housing section 6, the light source device 2 and the image forming device 3, which are the second cooling targets, housed in the second housing section 7, and the intake fan 41 that is housed in the enclosure 5 and cools the first cooling target and the second cooling targets in order with the air current K sucked from the outside of the enclosure 5. The device DB is located on the inflow side of the air current K with respect to the intake fan 41. The light source device 2 and the image forming device 3 are located on the outflow side of the air current K with respect to the intake fan 41.

In the embodiment, as an example, the dustproof filter 9 is disposed between the first housing section 6 and the intake fan 41. However, the dustproof filter 9 may be disposed between the intake port 64 and the first housing section 6.

In the embodiment, as an example, the air current K2 is supplied to the light source device 2, which is the second cooling target, and the air current K1 is supplied to the image forming device 3, which is the second cooling target. However, a portion of the projection optical device 4 housed in the enclosure 5 and a power supply unit may be set as the second cooling targets and may be cooled by supplying the air current K1 thereto. The portion of the projection optical device 4 housed in the enclosure 5 and the power supply unit may be set as the second cooling targets and may be cooled by supplying the air current K2 thereto.

Specific descriptions of the shapes, the numbers, the dispositions, the materials, and the like of the components of the light source device and the projector are not limited to the embodiment and can be changed as appropriate. In the embodiment, as an example, the light source device according to the present disclosure is mounted on the projector including the liquid crystal panel. However, not only this, but the light source device according to the present disclosure may be applied to a projector including a digital micromirror device as a light modulation device. The projector may not include a plurality of light modulation devices and may include only one light modulation device.

A projector according to an aspect of the present disclosure may include the following configuration.

The projector according to the aspect of the present disclosure includes: an enclosure including a first housing section configured to detachably house connected equipment, which is a first cooling target, and a second housing section configured to house a second cooling target; and a first fan housed in the enclosure and configured to cool the first cooling target and the second cooling target by supplying an air current sucked from an outside of the enclosure to the first housing section and the second housing section in order. The first housing section is located on an inflow side of the air current with respect to the first fan. The second housing section is located on an outflow side of the air current with respect to the first fan.

In the projector according to the aspect of the present disclosure, the enclosure may further include a third housing section disposed between the first housing section and the first fan and configured to house a dustproof filter.

In the projector according to the aspect of the present disclosure, in a planar view in an inflow direction of the air current into the first housing section, the third housing section may be disposed to overlap the first housing section, a longitudinal direction of the first housing section and a longitudinal direction of the third housing section may respectively cross the inflow direction of the air current, and the longitudinal direction of the third housing section may be along the longitudinal direction of the first housing section.

In the projector according to the aspect of the present disclosure, the enclosure may include an openable and closable lid body, and the connected equipment may be made attachable to and detachable from the first housing section by opening the lid body.

In the projector according to the aspect of the present disclosure, the enclosure may include an intake port for taking the air current into an inside and a separator configured to partition the first housing section, and a first through-hole communicating with the intake port and a second through-hole for causing the air current to flow out from the first housing section may be provided in the separator.

In the projector according to the aspect of the present disclosure, the enclosure may further include a duct including an intake port for taking the air current into the inside of the enclosure and configured to circulate the air current to the first fan via the intake port, and the first housing section may be provided in the duct.

In the projector according to the aspect of the present disclosure, the intake port, the first housing section, and the first fan may be disposed on a straight line.

The projector according to the aspect of the present disclosure may further include: a light source device; an image forming device configured to generate image light using light emitted from the light source device; and a second fan housed in the enclosure and configured to discharge exhaust having cooled the first cooling target and the second cooling target to the outside of the enclosure, the light source device and the image forming device may be the second cooling target, a part of the air current flowing out from the first fan may cool the image forming device and flow into the second fan, another part of the air current flowing out from the first fan may cool the light source device and flow into the second fan, and the second fan may discharge the exhaust including the part of the air current and the other part of the air current to the outside of the enclosure.

In the projector according to the aspect of the present disclosure, the connected equipment may be a device.

A projector according to an aspect of the present disclosure may include the following configuration.

The projector according to the aspect of the present disclosure includes: an enclosure including a first housing section and a second housing section; a first cooling target, which is connected equipment, detachably housed in the first housing section; a second cooling target housed in the second housing section; and an intake fan housed in the enclosure and configured to cool the first cooling target and the second cooling target in order with an air current sucked from an outside of the enclosure. The first cooling target is located on an inflow side of the air current with respect to the intake fan. The second cooling target is located on an outflow side of the air current with respect to the intake fan.

What is claimed is:

1. A projector comprising:
   an enclosure including a first housing part housing a first cooling target and a second housing part housing a second cooling target, the first cooling target being a terminal radiating heat and detachably housed in the first housing; and
   a first fan housed in the enclosure and cooling the first cooling target and the second cooling target by supplying an air current sucked from an outside of the enclosure to the first housing part and the second housing part in order, wherein
   the first housing part is located on an inflow side of the air current with respect to the first fan,
   the second housing part is located on an outflow side of the air current with respect to the first fan,
   the enclosure includes an intake port for taking the air current into an inside and a separator separating the first housing part, and
   a first through-hole communicating with the intake port and a second through-hole for causing the air current to flow out from the first housing part are provided in the separator.

2. The projector according to claim 1, wherein the enclosure further includes a third housing part housing a dustproof filter and disposed between the first housing part and the first fan.

3. The projector according to claim 2, wherein
   in a planar view in an inflow direction of the air current into the first housing part, the third housing part is disposed to overlap the first housing part,
   a longitudinal direction of the first housing part and a longitudinal direction of the third housing part respectively cross the inflow direction of the air current, and
   the longitudinal direction of the third housing part is along the longitudinal direction of the first housing part.

4. The projector according to claim 1, wherein the enclosure includes an openable and closable lid, and the terminal is made attachable to and detachable from the first housing part by opening the lid.

5. The projector according to claim 1, wherein
   the enclosure includes a duct circulating the air current to the first fan via the intake port, and
   the first housing part is provided in the duct.

6. The projector according to claim 1, wherein the intake port, the first housing part, and the first fan are disposed on a straight line.

7. The projector according to claim 1, further comprising:
a light source device;
a light modulator modulating light emitted from the light source device; and
a second fan housed in the enclosure and discharging exhaust having cooled the first cooling target and the second cooling target to the outside of the enclosure, wherein
the light source device and the light modulator are the second cooling target,
a part of the air current flowing out from the first fan cools the light modulator and flows into the second fan,
another part of the air current flowing out from the first fan cools the light source device and flows into the second fan, and
the second fan discharges the exhaust including the part of the air current and the another part of the air current to the outside of the enclosure.

8. The projector according to claim 1, wherein the terminal is a device.

9. A projector comprising:
an enclosure including a first housing part and a second housing part;
a first cooling target, which is a terminal radiating heat, detachably housed in the first housing part;
a second cooling target housed in the second housing part; and
an intake fan housed in the enclosure and cooling the first cooling target and the second cooling target in order with an air current sucked from an outside of the enclosure, wherein
the first cooling target is located on an inflow side of the air current with respect to the intake fan,
the second cooling target is located on an outflow side of the air current with respect to the intake fan,
the enclosure includes an intake port for taking the air current into an inside and a separator separating the first housing part, and
a first through-hole communicating with the intake port and a second through-hole for causing the air current to flow out from the first housing part are provided in the separator.

10. The projector according to claim 9, wherein the enclosure further includes a third housing part housing a dustproof filter and disposed between the first housing part and the first fan.

11. The projector according to claim 10, wherein
in a planar view in an inflow direction of the air current into the first housing part, the third housing part is disposed to overlap the first housing part,
a longitudinal direction of the first housing part and a longitudinal direction of the third housing part respectively cross the inflow direction of the air current, and
the longitudinal direction of the third housing part is along the longitudinal direction of the first housing part.

12. The projector according to claim 9, wherein the enclosure includes an openable and closable lid, and the terminal is made attachable to and detachable from the first housing part by opening the lid.

13. The projector according to claim 9, wherein
the enclosure includes a duct circulating the air current to the first fan via the intake port, and
the first housing part is provided in the duct.

14. The projector according to claim 9, wherein the intake port, the first housing part, and the first fan are disposed on a straight line.

15. The projector according to claim 9, further comprising:
a light source device;
a light modulator modulating light emitted from the light source device; and
a second fan housed in the enclosure and discharging exhaust having cooled the first cooling target and the second cooling target to the outside of the enclosure, wherein
the light source device and the light modulator are the second cooling target,
a part of the air current flowing out from the first fan cools the light modulator and flows into the second fan,
another part of the air current flowing out from the first fan cools the light source device and flows into the second fan, and
the second fan discharges the exhaust including the part of the air current and the another part of the air current to the outside of the enclosure.

16. The projector according to claim 9, wherein the terminal is a device.

* * * * *